United States Patent
Ohms

[19]

[11] Patent Number: 5,438,500
[45] Date of Patent: Aug. 1, 1995

[54] SWITCHING REGULATOR WITH A PUSH-PULL RESONANCE CONVERTER

[75] Inventor: Franz Ohms, Oberrot, Germany

[73] Assignee: ANT Nachrichtentechnik GmbH, Backnang, Germany

[21] Appl. No.: 167,819

[22] PCT Filed: May 23, 1992

[86] PCT No.: PCT/DE92/00417

§ 371 Date: Dec. 17, 1993

§ 102(e) Date: Dec. 17, 1993

[87] PCT Pub. No.: WO92/22956

PCT Pub. Date: Dec. 23, 1992

[30] Foreign Application Priority Data

Jun. 19, 1991 [DE] Germany .......... 41 20 146.9

[51] Int. Cl.$^6$ .......................................... H02M 3/335
[52] U.S. Cl. ............................................. 363/24; 363/26
[58] Field of Search .................. 363/24, 25, 26, 97, 363/134

[56] References Cited

U.S. PATENT DOCUMENTS

| | | | |
|---|---|---|---|
| 4,443,840 | 4/1984 | Geissler et al. | 363/24 |
| 4,980,813 | 12/1990 | Wells | 363/134 |
| 5,001,413 | 3/1991 | Ohms et al. | 323/285 |
| 5,119,283 | 6/1992 | Steigerwald et al. | 363/37 |

FOREIGN PATENT DOCUMENTS

| | | |
|---|---|---|
| 0077958 | 2/1984 | European Pat. Off. . |
| 2501527 | 7/1976 | Germany . |
| 2941009 | 4/1981 | Germany . |
| 3812861 | 10/1989 | Germany . |
| 0355333 | 2/1990 | Germany . |

OTHER PUBLICATIONS

"Proceedings of the XVth International PCI Conference," Intertec Communications, Ventura, Calif., pp. 94–122, Jun. 1988.

*Primary Examiner*—R. Skudy
*Assistant Examiner*—E. To
*Attorney, Agent, or Firm*—Spensley Horn Jubas & Lubitz

[57] ABSTRACT

A switching regulator having a series resonance push-pull converter (GW) and two clocked boost regulators (AR1, AR2) connected in series with the converter, wherein: the converter comprises a transformer (Tr) having two primary windings (w1, w2) which are galvanically isolated from one another, and two push-pull switches (S1, S2) each connected in series with a respective one of the primary windings; each of the boost regulators comprises a series inductance (L1, L2) and an output capacitor (C1, C2); and the boost regulators are connected to the converter to form two push-pull branches, each of the push-pull branches being composed of the series inductance of one of the boost regulators connected in series with a respective one of the primary windings and a respective one of the push-pull switches, and the output capacitor of each of the boost regulators constituting a resonance capacitor of the converter.

13 Claims, 3 Drawing Sheets

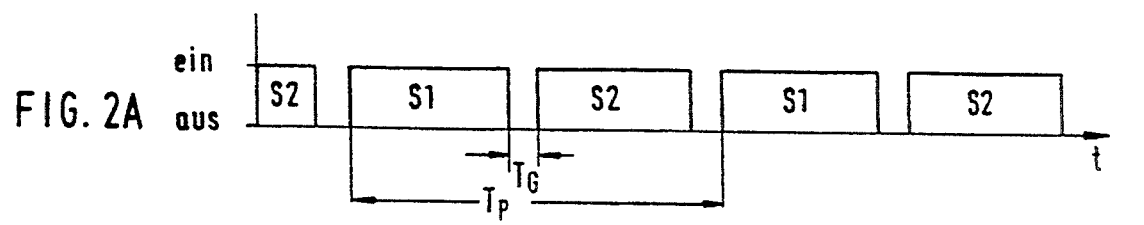
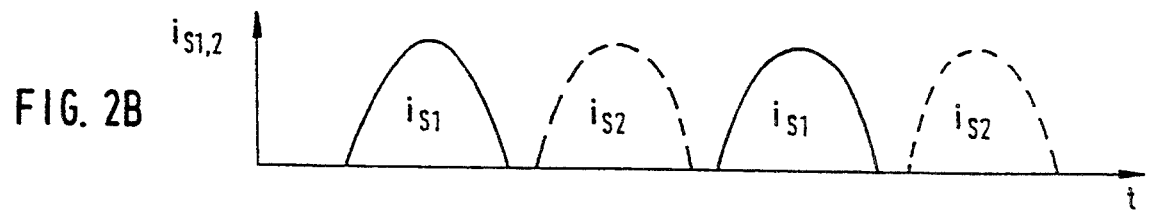
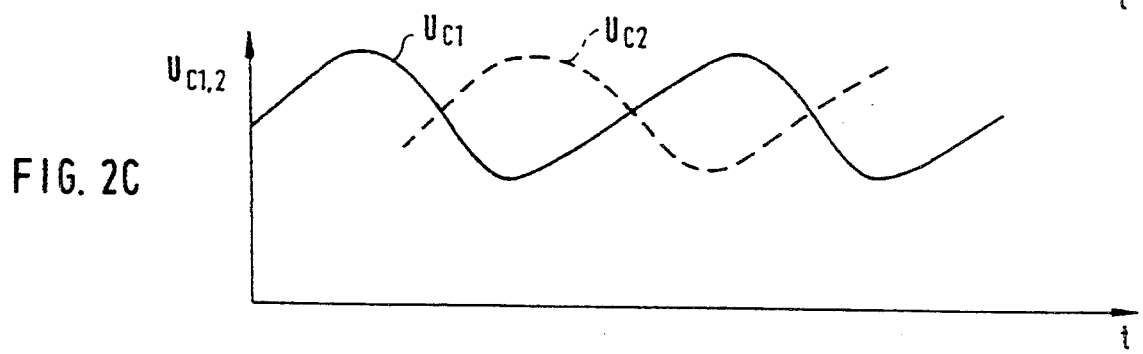
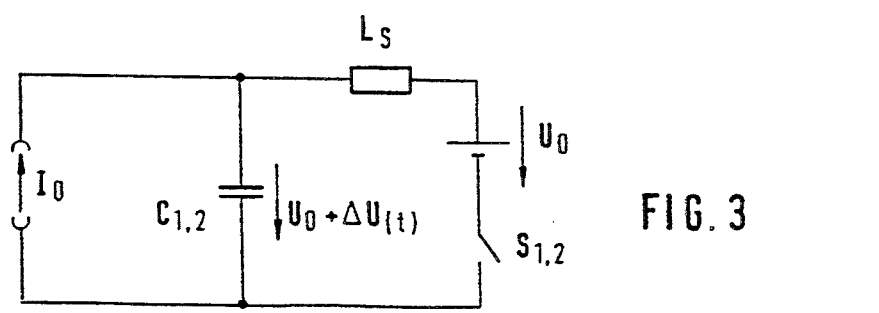

SWITCHING REGULATOR WITH A PUSH-PULL RESONANCE CONVERTER

BACKGROUND OF THE INVENTION

The invention relates to switching regulator with a push-pull converter embodied as a resonance converter, to which a clocked pre-regulator is series-connected, wherein separate primary windings are provided for the push-pull transformer. Such a switching regulator is known from DE 38 12 861.

Resonance converters of this type are known, for example, from "Proceedings of the XVth International PCI Conference", June 1988, Intertec Communications, Ventura, Calif., USA, pages 94 to 122.

It is known from German Patent Publication DE 29 41 009 C2 to series-connect a series switching regulator to a conventional push-pull converter, in particular for the purpose of processing greatly varying input voltages, for example with satellite power supplies. As a rule, the series switching regulator is pulse-width modulated as a function of the output voltage of the switching regulator. The downstream connected push-pull converter is operated either with push-pull pulses of a constant length or with pulse-width modulated pulses.

SUMMARY OF THE INVENTION

It is an object of the invention to embody the switching regulator of the previously mentioned type in such a way that a high degree of efficiency can be achieved. This object is attained by a switching regulator comprising a series resonance push-pull converter (GW) and two clocked boost regulators (AR1, AR2) connected in series with the converter, wherein: the converter comprises a transformer (Tr) having two primary windings (w1, w2) which are galvanically isolated from one another, and two push-pull switches (S1, S2) each connected in series with a respective one of the primary windings; each of the boost regulators comprises a series inductance (L1, L2) and an output capacitor (C1, C2); and the boost regulators are connected to the converter to form two push-pull branches, each of the push-pull branches being composed of the series inductance of one of the boost regulators connected in series with a respective one of the primary windings and a respective one of the push-pull switches, and the output capacitor of each of the boost regulators constituting a resonance capacitor of the converter.

The switching regulator in accordance with the invention has the advantage that it is possible to select the capacity of the corresponding resonance converter to be higher than in conventional resonance or quasi-resonance converters. Sufficient time is available for recharging a resonance capacitor, namely in each case the time during which the respective push-pull switch is open and the blackout time. The transformer of the push-pull converter is better utilized than with other comparable resonance converters, i.e. with the same output it is possible to reduce the structural size. This is of particular advantage for switching regulators used in satellites. The regulation of the two boost regulators is very dependable, because the regulating criteria are derived from separate branches of the push-pull converter. Interference signals (ripples) are greatly suppressed by adding the voltages at the resonance capacitors for regulating the boost regulators.

BRIEF DESCRIPTION OF THE DRAWING

An exemplary embodiment of the invention will be described in greater detail with reference to the drawings.

FIGS. 2A, 2B and 2C are diagrams of selected signals for the switching regulator in accordance with FIG. 1, FIG. 3 an equivalent circuit diagram on the push-pull converter for one of the push-pull branches.

DESCRIPTION OF THE PREFERRED EMBODIMENTS

Figure 1:
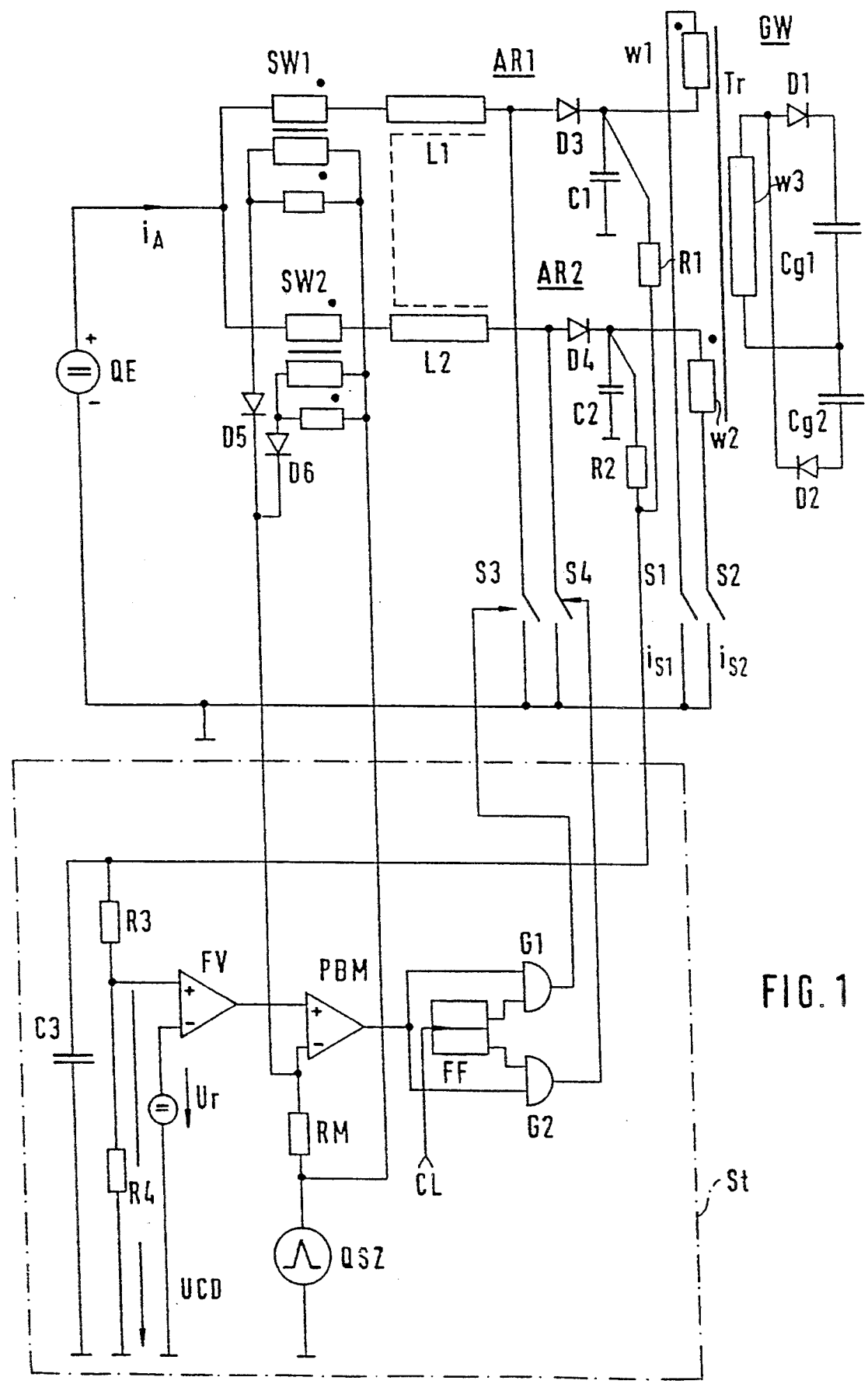
FIG. 1 a principal circuit diagram of a switching regulator in accordance with the invention.

Two boost regulators AR1, AR2 (boost regulators), supplied in parallel by an input dc-voltage source QE are shown in FIG. 1, downstream of which a parallel push-pull dc-voltage converter GW is connected. The boost regulators AR1 and AR2 each comprise an actuator in the transverse branch, symbolized here by switches S3 and S4, and a series inductance L1 or L2 with series-connected diodes D3 or D4. The outputs of the boost regulators AR1 and AR2 respectively have a capacitor C1 or C2 in the transverse branch. The series inductances L1 and L2 can be magnetically separated from each other or loosely coupled. The push-pull converter GW comprises a power transformer Tr with two primary windings w1 and w2, which are galvanically separated from each other, and a secondary winding w3. The output of each boost regulator AR1 or AR2 is connected to a push-pull branch of the push-pull converter GW. In the exemplary embodiment of FIG. 1 this has been realized in that the diode D3 of the boost generator AR1 is series-connected with the primary winding w1, and the diode D4 of the boost regulator AR2 is series-connected with the primary winding w2. Two rectifier circuits with diodes D1, D2 and smoothing capacitors Cg1 and Cg2 are shown in the output circuit of the push-pull converter GW. The two push-pull switches S1 and S2 of the push-pull converter are respectively disposed in series in relation to one of the primary windings w1 or w2. The winding direction of the primary windings w1 and w2 is marked by dots in FIG. 1. In contrast to customary solutions, two resonance capacitors C1 and C2 are provided for embodying the push-pull converter as a resonance converter. These resonance capacitors C1, C2 simultaneously constitute the output capacitors of the boost regulators AR1 and AR2. In respect to the push-pull branches, they are respectively located parallel to the series circuit formed from the primary winding w1 or w2 and the push-pull switches S1 or S2. In an alternate embodiment the resonance capacitors can also be disposed at another location in the push-pull branches.

The switching interplay of the push-pull switches S1 and S2 are shown in FIG. 2A. The switches S1 and S2 are alternatingly switched on during the length of a period $T_p$. Both switches are currentless during a blackout time $T_G$. This blackout time $T_G$ is preferably selected such that during this time the resonance structure in the form of the push-pull converter can reverse, if required with the inclusion of parasitic winding capacitors or rectifier capacitors. A control device in accordance with EP 77 958 B1 can be used for the preparation of the control signals for the switches S1 and S2, taking into consideration the blackout time $T_G$. The currents $i_{s1}$ and $i_{s2}$ in the push-pull branches on the primary side are shown in FIG. 2B, ($i_{s2}$ is dashed). FIG. 2C, shows the voltages $U_{c1}$ and $U_{c2}$ at the resonance capacitors C1, C2. FIG. 3 shows an equivalent circuit diagram for a push-pull branch. The input current $I_o$ of the push-pull converter is represented by a current source. The transformer Tr is represented by its leakage inductance $L_s$. The voltage $U_o$ represents the output voltage transformed from the secondary circuit. The voltage $U_{o+\Delta U(t)}$ is then applied at the resonance capacitor C1 or C2. The following equation then applies for the current $i_{L(t)}$ in the resonance circuit:

$$i_{L(t)} = I_o(1 - \cos\omega t) + \frac{\Delta U}{\sqrt{L_s/C_{1,2}}} \sin\omega t$$

$$\text{with } \omega \approx \frac{1}{\sqrt{L_s \cdot C_{1,2}}}$$

with $\Delta U = \frac{I_o}{2\,C_{1,2}} (T_p/ * T_G)$ the following applies:

$$i_{L(t)} = I_o \left[ 1 - \cos\omega t + \left(\frac{T_p}{4} + \frac{T_G}{2}\right) \frac{1}{\sqrt{L_s \cdot C_{1,2}}} \sin\omega t \right].$$

Figure 4:
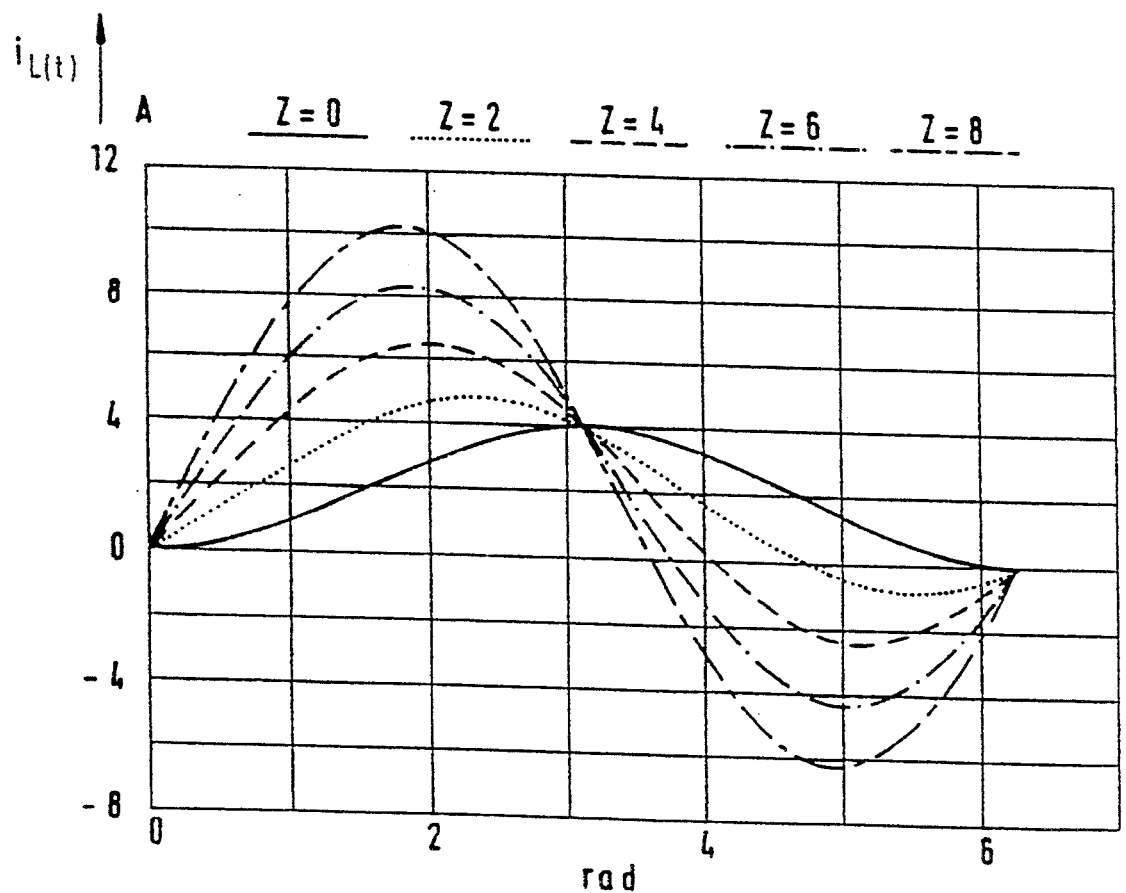
FIG. 4 is a diagram showing the reversing current of the push-pull converter for different sizes of structural elements.

For different values of $$Z = \frac{\Delta U}{\sqrt{L_s/C_{1,2}}}$$

the reversing current $i_{L(t)}$ is shown in FIG. 4. The higher the value Z is selected, the higher the resonance rise. It is advantageous to select the value Z as high as possible in order to obtain a steep crossover of the current and to obtain assured switching in this way.

A common control circuit St is provided for generating the control signals for the boost regulators AR1 and AR2, by means of which the actuators S3 and S4 can be alternately switched on. The control circuit St contains a pulse width modulator PBM. The voltages at the resonance capacitors C1 and C2 are utilized as control criteria for the pulse width modulator PBM, as well as the energy absorption current $i_A$ of the switching regulator flowing between the input dc-voltage source and the common connecting point at the input of the two boost regulators AR1 and AR2. In an alternative manner and as shown in FIG. 1, it is also possible to detect the currents absorbed by each one of the boost regulators AR1 and AR2 by means of a current converter SW1 and SW2 and to rectify them by means of the two rectifiers D5, D6. The outputs of the two rectifiers D5, D6 are connected and brought to a common resistor RM, which is connected in series with a sawtooth voltage QSZ to the inverting input of the pulse width modulator PBM embodied as a comparator. The separate detection of the currents of the boost regulators AR1 and AR2 has the advantage that asymmetries between the switching times of the two switches S3 and S4 cannot result in errors. The non-inverting input of the pulse width modulator PBM is connected with the output of an error signal amplifier FV, which compares the other switching criteria—in this case the voltages at the resonance capacitors C1, C2—with a reference voltage Ur. The mode of operation of this control circuit St can be found in U.S. Pat. No. 5,001,413. Thus, the length of the control pulse for the switching regulator actuators S3 and S4 depends on the strength of the energy absorption current $i_A$, or the energy absorption currents of the individual boost regulators, and the strength of the error signal at the output of the error signal amplifier FV. A summator net, consisting of the resistors R1, R2, R3, R4, and capacitor C3, is provided to obtain the resonance capacitor-dependent control criteria, by means of which a voltage UCD is obtained which is proportional to the sum of the added voltages at the resonance capacitors C1 and C2. The capacitor C3, in parallel to the potentiometer R3, R4, is used to integrate the added voltages.

To obtain the push-pull pulses for the switches S3 and S4, it is possible to employ a conventional pulse divider stage at the output of the pulse width modulator PBM, which can be composed of two AND-gates G1 and G2 and a push-pull flip-flop FF, as in U.S. Pat. No. 5,001,413, for example.

I claim:
1. A switching regulator comprising a series resonance push-pull converter (GW) and two clocked boost regulators (AR1 and AR2) connected in series with said converter, wherein:
    said converter comprises a transformer (Tr) having two primary windings (w1, w2) which are galvanically isolated from one another, and two push-pull switches (S1, S2) each connected in series with a respective one of said primary windings;
    each of said boost regulators comprises a series inductance (L1, L2) and an output capacitor (C1, C2); and
    said boost regulators are connected to said converter to form two push-pull branches, each of said push-pull branches being composed of said series inductance of one of said boost regulators connected in series with a respective one of said primary windings and a respective one of said push-pull switches, and said output capacitor of each of said boost regulators constituting a resonance capacitor of said converter.

2. A switching regulator in accordance with claim 1, characterized in that the two boost regulators (AR1, AR2) can be operated in parallel from an input dc-voltage source (QE).

3. A switching regulator in accordance with claim 1, characterized in that the actuators (S3, S4) of the two boost regulators (AR1, AR2) can be alternatingly activated via a common control circuit (St).

4. A switching regulator in accordance with claim 3 wherein the control circuit is connected for controlling said boost regulators in response to a voltage across said output capacitor of one of said boost regulators.

5. A switching regulator in accordance with claim 4 wherein said control circuit comprises: a summator net connected for summing the voltages across said output capacitors; and a pulse width modulator connected to produce a control signal in response to an input signal form said summator net.

6. A switching regulator in accordance with claim 5 wherein said control circuit further comprises an error signal amplifier connected between said summator net and said pulse width modulator.

7. A switching regulator in accordance with claim 1 characterized in that the series inductances (L1, L2) of the boost regulators (AR1, AR2) are loosely magnetically coupled.

8. A switching regulator in accordance with claim 1 wherein said two push-pull switches are connected together at a first connecting point remote from said primary windings and, in each of said push-pull branches said series inductance is connected to said respective one of said primary windings at a second connecting point, and said output capacitor is connected between said first and second connecting points.

9. A switching regulator in accordance with claim 1 characterized in that the push-pull switches (S1, S2) can be operated with a blackout time during which both switches (S1, S2) are currentless at the same time, and that this blackout time ($T_G$) is of such a duration that, on the one hand, the push-pull converter (GW) as a resonance structure can assuredly reverse and, on the other hand, there is sufficient time available for recharging the respective resonance capacitor (C1; C2).

10. A switching regulator in accordance with claim 1 further comprising a control circuit connected for controlling said boost regulators at least partially on the basis of a direct current absorbed by said regulator.

11. A switching regulator in accordance with claim 10 wherein said control circuit comprises means connected for superimposing a sawtooth current on the direct current.

12. A switching regulator in accordance with claim 1 further comprising: means for supplying a direct current to said boost regulators; and a control circuit connected for controlling said boost regulators at least partially on the basis of the direct current.

13. A switching regulator in accordance with claim 12 wherein said control circuit comprises means connected for superimposing a sawtooth current on the direct current.

* * * * *